3,441,460
PROCESS FOR SIMULTANEOUSLY SEVERING AND SEALING LAYERS OF THERMOPLASTIC MATERIALS
Keith S. Carmichael, Claymont, Del., assignor to E. I. du Pont de Nemours and Company, Wilmington, Del., a corporation of Delaware
Filed June 9, 1965, Ser. No. 462,600
Int. Cl. B32b 31/18, 31/26
U.S. Cl. 156—251                                                    2 Claims

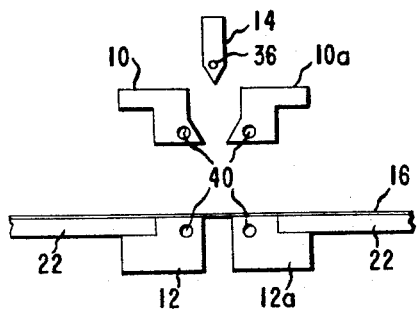
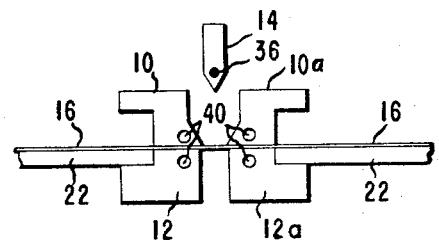
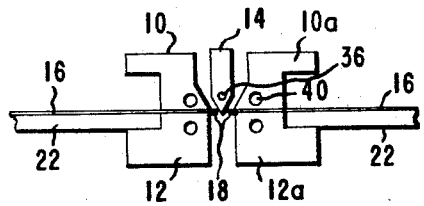
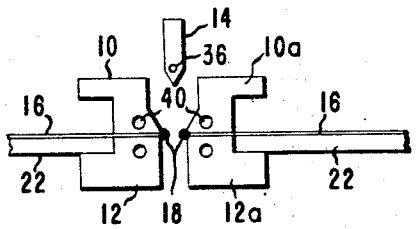
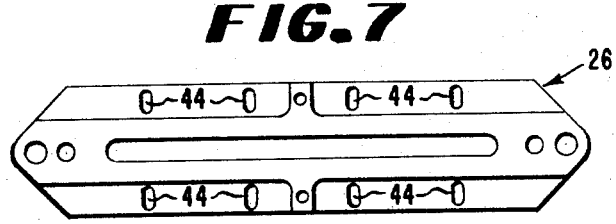
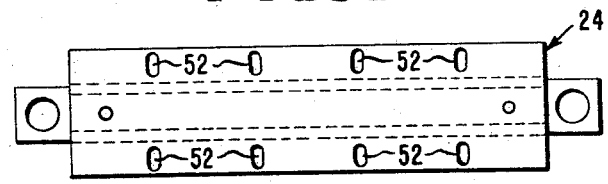
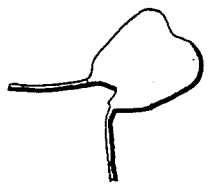
INVENTOR
KEITH S. CARMICHAEL

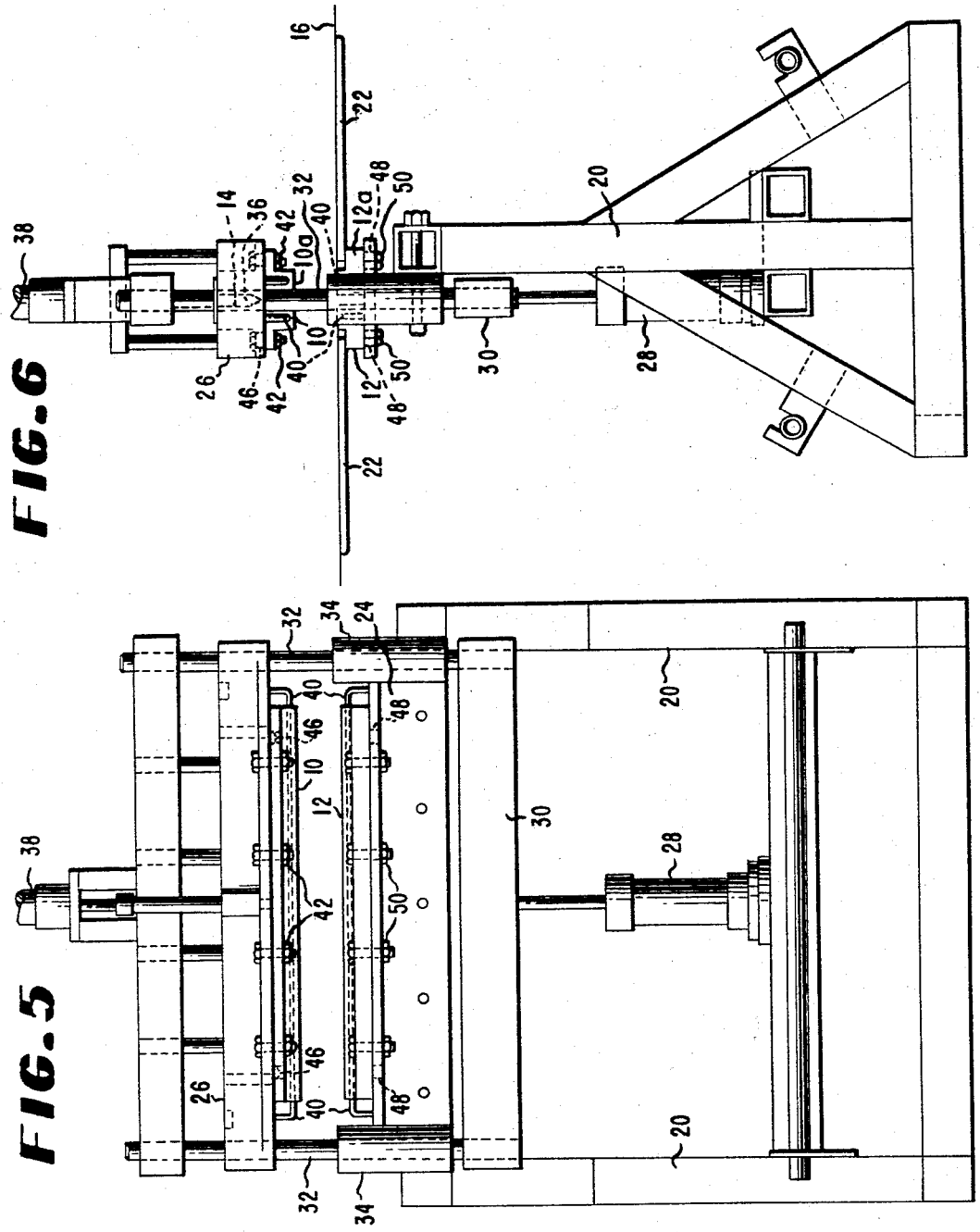

ABSTRACT OF THE DISCLOSURE

Multiple layers of thermoplastic film are simultaneously severed and sealed together at the severed edges by clamping the films together in superposed relationship at both sides of, and in close proximity to the line of severance by means of cooled clamps, and severing the superposed films with a heated tapered knife the taper of which is such that as the severed, heated edges of the films shrink to form beads the advancing knife is maintained in contact with the retreating beads to maintain a uniform heat flow from the knife to bead for a period of time after severance has been accomplished whereby to enlarge the beads.

---

This invention relates to an apparatus and a method for heat sealing multiple layers of thermoplastic materials. Such sealing is normally employed in the formation of bags, pouches, tubes and envelopes.

Devices for simultaneously severing and sealing two or more sheets of thermoplastic film ordinarily employ a heated wire or knife. However, these devices are not well adapted to provide a smooth, even seal of uniform strength for different weights or thicknesses of heat shrinkable oriented forms. In addition, as the heated film is severed, it shrinks and moves away from the heat source, thus causing puckers, wrinkles, and weak spots due to uneven cooling. It was also found that when heat shrinkable, oriented films were severed and sealed, the seal and its adjacent areas became disorientated causing the seal to be less strong than the remainder of the film.

Therefore, it is an object of this invention to provide a method and an apparatus for severing and sealing multiple layers of thermoplastic material, particularly heat-shrinkable oriented films, through which close control of temperature is maintained; to provide a method and an apparatus which can be applied to a variety of heat-shrinkable oriented films; to provide a method and an apparatus by which the heat-seal obtained is essentially equivalent in strength to the material adjoining the seam; and to provide a method and an apparatus in which the resulting heat-seal is smooth, even and of uniform strength.

The objects are accomplished by an apparatus and a method for simultaneously severing and sealing thermoplastic material, especially heat-shrinkable oriented films. The apparatus comprises a frame; a first clamping assembly or member comprising two bars or jaws spaced from one another and means for adjusting or varying the space between them; a second clamping assembly or member similarly constructed; both said first and second clamping assemblies being aligned with respect to one another and mounted on said frame for movement to hold the layers of the thermoplastic material securely on both sides of the line of severing; means for cooling said first and second clamping assemblies; a tapered knife mounted on said frame for movement while hot in and out of the space separating the bars or jaws of both said first and second clamping assemblies whereby the thermoplastic material is intersected and severed; said knife having a taper such that after the material is severed the knife continues to transmit heat uniformly to the molten severed edges of the thermoplastic material; and means to heat said knife.

The process comprises securely holding superimposed layers of heat shrinkable thermoplastic films, severing the superimposed layers with a heated tapered knife, and advancing the heated knife as the severed ends shrink to form beads to maintain a uniform heat transfer from the knife to the forming bead.

The invention will be more clearly understood by referring to the description and the drawing which follow.

FIGURE 1 is a partial cross-sectional view of the knife and clamps in open position;
FIGURE 2 is the same except that the clamps are in clamping position;
FIGURE 3 is the same as FIGURE 2 except that the knife is in severing position;
FIGURE 4 is the same as FIGURE 2 except that the bead seals of the severed films have formed;
FIGURE 5 is a side elevation of the apparatus or device of the invention;
FIGURE 6 is an end view of the apparatus;
FIGURE 7 is a top view of the upper crosshead; and
FIGURE 8 is a top view of the guide plate of the apparatus;
FIGURE 9 depicts the type of bead seal produced by the apparatus.

FIGURES 1–4 depict the operation of severing and sealing. FIGURE 1 shows the pair of first clamping bars or jaws 10 and 10a and the pair of second clamping bars or jaws 12 and 12a in an open position in which the tapered knife 14 is positioned away from the layers of superimposed film 16. FIGURE 2 shows the clamping bars in closed position to securely hold the film layers. FIGURE 3 depicts the severing sequence by the heated knife in which the beads 18 have just begun to form, while in FIGURE 4 the beads have formed and the knife has been withdrawn.

As seen in FIGURES 3 and 4, the molten beads will shrink back toward the cooled clamping bars until they contact them and solidify. Thus it is of critical importance in this invention to taper the knife so that the movement of the tapered knife follows the retreating beads closely to maintain a uniform heat flow to the beads. Such a uniform heat flow results in the formation of smooth, even bead seams.

Because the space between the two bars of the clamping assembly can be varied, the size of the bead that is formed can be controlled.

Referring now to FIGURES 5–8, which depict the preferred embodiment, the apparatus comprises a frame 20, which contains two plates 22, upon which the layers of film 16 are placed. The film can be drawn over the plates from a wound roll of J-wrap film.

Between the plates are the bars 12 and 12a of the second clamping assembly which flatly engage one side of the film sheets. These bars are attached to a guide plate 24 and are mounted on the plate so that the distance between the bars can be adjusted. The guide plate is rigidly attached to the frame.

The first clamping assembly comprises a pair of bars 10 and 10a which flatly engage the opposite side of the film sheets, and a cross-head 26. The opposing faces of these two bars are tapered to fit the taper of intervening knife 14. The bars are attached to cross-head 26 and are mounted upon it to adjustably fix the distance between the bars.

An air cylinder 28 is connected to a crossbar 30 which transfers the thrust of the air cylinder to the clamping bars 10 and 10a through crosshead 30 and support rods 32 which ride in ball bushings 34.

Once the air cylinder has operated the first clamping assembly into clamped position, the tapered knife 14, preheated by heater 36 is automatically activated by air cylinder 38.

Each bar of the clamping assemblies is provided with a tube 40 extending longitudinally through the bar, through which a cooling fluid flows by means of attached hoses (not shown).

In operation, the space between bars 10 and 10a and between bars 12 and 12a is pre-adjusted to regulate the size of the beads formed. The size desired will depend upon the type of film to be sealed and the amount of shrinkage of the film. In general the thickness of the bead should be at least five times the thickness of the film to compensate for the loss of strength due to disorientation in the bead. The bars may be easily spaced and aligned by moving the knife 14 down until its tapered edges contact the tapered sides of bars 10 and 10a. By loosening bolts 42, which fix the first clamping assembly to crosshead 26, the bars 10 and 10a are forced apart through pressure of the knife. The bolts 42 move within slotted holes 44 in crosshead 26, and when the desired spacing distance is achieved, the bolts are tightened. Bars 12 and 12a may then be spaced and aligned with bars 10 and 10a by inserting a dowel through holes 46 in each bar 10 and 10a and extending the dowels through holes 48 in bars 12 and 12a. Bars 12 and 12a can be moved to align with the dowels by loosening bolts 50 and moving them within the slotted holes 52 in guide plate 24. Once alignment is obtained the bolts are tightened, the dowels removed and the knife moved back to a rest position. The knife air cylinder 38 is then adjusted so that in actual operation the cylinder will operate the knife to sever the film layers but will halt the knife movement short of contact with bars 10 and 10a.

The layers of film to be severed and sealed are then placed upon plates 22 and air cylinder 28 activated. The action of the air cylinder forces crossbar 30 down, which in turn, through support rods 32, forces crosshead 26 down. Bars 10 and 10a will then contact and clamp the film rigidly between clamps 12, 12a and 10 and 10a. Water flows through the cooling tubes 40 in each bar to cool the clamped portions of the film to prevent puckering and deorientation of these portions of film. The hot tapered knife transmits heat uniformly to the severed edges of the thermoplastic material causing the edges of two sheets to melt and form one common bead of molten polymer. As the knife continues down, the film shrinks back from the knife and continues to melt forming larger beads until the molten beads contact the water cooled jaws. The beads are then solidified by the cooled jaws which also clamp the film. Heat from the bead is not allowed to creep up the film adjacent to the bead. Therefore, film deorientation and shrinkage do not occur.

When the bars reach clamping position, the air cylinder 38 is activated and the knife moves to sever the film. The heat from the knife and the dwell time of the knife may be adjusted for the type of film employed. The knife is then operated back to rest position and the bead seals allowed to cool.

The knife 14 is heated by heater 36 which is embedded within the knife. The heater within the knife may be of the cartridge type and its temperature varied by connecting it to a powerstat. The taper angle of the knife should be from about 30° to 45° to allow the heater to be placed as close as possible to the tapered sides of the knife.

The clamping jaws and knife may be of any suitable contour, e.g., curved contour to produce round bottom bags.

The apparatus and method is further exemplified by the following examples.

Example 1

Two 1 mil thick films of heat shinkable oriented polyethylene film having a shrinkage at 100° C. of 20–30 percent were placed in the apparatus shown in FIGURES 5 and 6. The clearance between the bars was set at 3/8 inch and the knife air cylinder was adjusted to allow the knife to penetrate 1/8 inch below the film layers. At this degree penetration, the clearance between the edges of the bars 12 and 12a and the tapered edge of the knife was 1/8 inch. The heater within the knife was adjusted to give the steel knife a temperature of about 900° F. and the air cylinder was further adjusted to give the knife a dwell time of 5 seconds. Water was continuously passed through the ducts or tubes in the aluminum clamping bars.

After the films were severed and the beads cooled, the strength of the bead seal was determined by several tests.

The peel strength, as measured by a "Suter" peeler, averaged about 2215–2225 gms./1/2 inch. A strip of the film that did not contain a bead seal was similarly tested and the ultimate strength found to be about 2670 gms./1/2 inch. Thus, the bead seals were essentially equivalent to the unsealed film in ultimate strength.

The impact strength of the seals was tested by dropping a 53 gram weight from a height of 20 inches directly on the seal. The seal is positioned parallel to and centered from opposed clamping jaws. For seals to be acceptable, a minimum of 50% must withstand 10 drops at room temperature. Fifty seals were so tested and 87.5 percent found to withstand 10 drops at room temperature.

Example 2

With the same apparatus and method of operation as in Example 1, two films of heat shrinkable oriented polypropylene having a shrinkage of 10–20 percent at 130° C. were severed and heat sealed. One film was 1.1 mil in thickness and the other 1.2 mil. The peel strength for the seals obtained averaged 4000 gms./1/2 inch at room temperature.

The impact strength was tested as in Example 1; however, for polypropylene, acceptable seals must be able to withstand 1 drop at 0° F. Of 70 seals tested, 53% withstood 10 drops at 0° F.

When applying the device of this invention to the severing and sealing of heat shrinkable, oriented polyolefin films it has been found that the preferred distance between the bars, e.g., bars 10 and 10a at their closest point, for maximum peel strength for 1 mil films, lies between 0.375 inch and 0.625 inch; and that the distance between the tapered knife and the tapered side of bar 10 or 10a, taken perpendicularly to both tapers, is preferably between 0.0125 inch and 0.0500 inch. Optimum knife temperatures for such a film lie between 600° F. and 1200° F., with about 90° F. (i.e., between 875° F. and 925° F.) preferred. The dwell time of the knife (i.e., the position shown in FIGURE 3) is preferably between 0.1 second and 4 seconds; and the optimum cooling time after withdrawal of the knife but before removal of the clamping bars is preferably 1 second or more. This produces a bead seal of diameter about 5 times the film thickness.

The bead produced by the device is of the type shown in FIGURE 9. This type of bead, in which the film layers are attached to the bead and not to each other, has been found to produce a very strong seal. In addition, flat stackable bags are produced.

As many apparently satisfactorily different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for simultaneously severing and sealing multiple layers of thermoplastic materials, which comprises, securely holding superimposed layers of thermoplastic material, severing said layers with a heated tapered knife, advancing the knife as the severed ends of material shrink to form a receding bead and maintaining the taper of said advancing knife in contact with said receding bead for a period of time after severance whereby to maintain a uniform heat transfer from the knife to the bead and to enlarge said bead while continuously cooling the portions of said materials adjacent the bead.

2. The process of claim 1 wherein the thermoplastic material is heat shrinkable oriented polyethylene film, and the temperature of the heated knife is between 600° F. and 1200° F.

References Cited

UNITED STATES PATENTS

| 3,033,257 | 5/1962 | Weber | 156—251 |
| 3,066,064 | 11/1962 | Pommer | 156—583 |
| 3,257,256 | 6/1966 | Lehmacher et al. | 156—515 |
| 3,340,129 | 9/1967 | Grevich | 156—515 |

DOUGLAS J. DRUMMOND, *Primary Examiner.*